United States Patent [19]
Gibbons et al.

[11] Patent Number: 5,929,201
[45] Date of Patent: Jul. 27, 1999

[54] FLUORINATED AMINE PRODUCTS

[75] Inventors: Wayne M. Gibbons, Bear, Del.; Paul J. Shannon, Exton, Pa.; Shao-Tang Sun, Newark, Del.

[73] Assignee: Elsicon, Inc., Wilmington, Del.

[21] Appl. No.: 08/859,403

[22] Filed: May 20, 1997

Related U.S. Application Data

[63] Continuation-in-part of application No. 08/645,824, May 14, 1996., Pat. No. 5,817,743, which is a continuation-in-part of application No. 08/624,942, Mar. 29, 1996., Pat. No. 5,731,405

[51] Int. Cl.$^6$ .......................... C08G 73/10; C08G 69/26; G02F 1/13
[52] U.S. Cl. .......................... 528/353; 528/125; 528/128; 528/170; 528/171; 528/172; 528/173; 528/174; 528/179; 528/183; 528/185; 528/188; 528/220; 528/229; 528/350; 359/44; 359/90; 350/341; 350/345; 350/346; 350/349; 350/350 R; 350/350 S; 350/351

[58] Field of Search ..................................... 528/353, 174, 528/125, 128, 170, 171, 172, 173, 179, 183, 185, 188, 220, 229, 350; 359/44, 90; 350/345, 341, 346, 349, 350 R, 350 S, 351

[56] References Cited

U.S. PATENT DOCUMENTS 4,974,941   12/1990   Gibbons et al. ...................... 350/350 S
5,032,009   7/1991    Gibbons et al. ........................ 350/341

*Primary Examiner*—P. Hampton-Hightower
*Attorney, Agent, or Firm*—Donald W. Huntley

[57] ABSTRACT

The present invention relates to amine compositions and the preparation of polyimides. The polyimides can be used for inducing alignment of a liquid crystal medium with polarized light and liquid crystal display elements.

13 Claims, No Drawings

FLUORINATED AMINE PRODUCTS

CROSS-REFERENCE TO RELATED APPLICATION

This Application is a Continuation-in-Part of application U.S. Ser. No. 08/645,824, filed on May 14, 1996, and now U.S. Pat. No. 5,817,743 which is a Continuation-in-Part of application U.S. Ser. No. 08/624,942, filed on Mar. 29, 1996 and now U.S. Pat. No. 5,731,405.

BACKGROUND OF THE INVENTION

The present invention relates to compositions useful for inducing alignment of a liquid crystal medium with polarized light and liquid crystal display elements.

Most liquid crystal devices, including displays, have a finite pre-tilt angle, controlled, for instance, by the mechanical buffing of selected polymeric alignment layers, liquid crystal molecules in contact with such a layer align parallel to the buffing direction, but not exactly parallel to the substrate. The liquid crystal molecules are slightly tilted from the substrate, for instance by about 0.5–15 degrees. For most display applications a finite and uniform pre-tilt angle of the liquid crystal is desirable. For other display applications requiring predominately homeotropic alignment of liquid crystals, a much higher pre-tilt angle is desired, for instance, 85–89.9 degrees. In these cases, controlling the pre-tilt by a mechanical rubbing process is very difficult.

A new process for aligning liquid crystals with polarized light was disclosed in U.S. Pat. No. 4,974,941, entitled "Process of Aligning and Realigning Liquid Crystal Media". Controlling the pre-tilt angle of liquid crystal in contact with optical alignment layers, while maintaining high uniformity of alignment, is an important requirement for optical alignment materials.

In this context, continuing effort has been directed to the development of compositions for optical alignment of liquid crystals and liquid crystal displays.

SUMMARY OF THE INVENTION

The present invention provides polyamic acids and polyimides which are particularly useful in the alignment of liquid crystals and liquid crystal displays. Specifically, this instant invention provides a polyamic acid which is the reaction product of a monoamine of the formula:

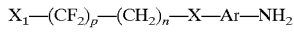

$$X_1-(CF_2)_p-(CH_2)_n-X-Ar-NH_2$$

wherein Ar is selected from the group consisting of

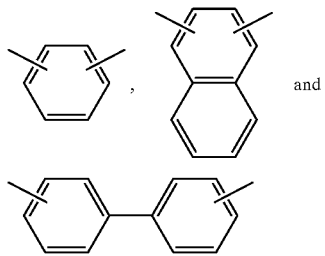

X is selected from the group consisting of —O—, —S— and —NR— and a covalent bond, wherein R is a $C_1$ to $C_4$ hydrocarbon, X, is selected from H and F, n is 0–4 and p is 6–20, wherein when X is -S- or a covalent bond, n is 1–4 and wherein the monoamine comprises about from 0.1 to 15 mol % of the amine component; at least one diamine; and at least one tetracarboxylic dianhydride.

The present invention further provides polyimides derived from these polyamic acids, a process for inducing pre-tilt using these polyimides, and the resulting liquid crystal display elements.

DETAILED DESCRIPTION OF THE INVENTION

As used herein "substrate" means the supporting structure for an alignment layer. A substrate can be any solid combination of layered materials that provide a useful function for the final optical alignment layer or liquid crystal display. For example, the substrate can be any combination of the following materials: crystalline or amorphous silicon, glass, plastic, including polyester, polyethylene and polyimide; quartz, indium-tin-oxide, gold, silver, silicon dioxide, polyimide, silicon monoxide, anti-reflective coatings, color filter layers, polarizers and phase compensating films. In practice, some of these materials are deposited or coated onto a basic supporting structure such as glass or plastic.

As used herein, the term "alignment layer" means the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

As used herein, the term "alignment of liquid crystals" means that the long molecular axes of the liquid crystal molecules have a preferred local alignment direction, or director. The director is the average direction of an ensemble of liquid crystal molecules which can be quantified by order parameter or other measurements well known in the art. Orientational order parameters are routinely described by the equation:

$$S=½<3\cos^2\alpha-1>$$

where α is the angle between the director and the long axis of each molecule, the molecules being regarded as cylindrically symmetric. The brackets denote an average over the ensemble of molecules. Order parameters range from 0 to 1.0. A 0 value indicates no long range alignment of the liquid crystals is present. A value of 1.0 indicates the liquid crystal molecules are fully aligned along a director. Preferred order parameters resulting from the process of the instant invention are in the range of about from 0.1 to 1.0.

"Optical alignment layer" herein refers to an alignment layer that contains anisotropically absorbing molecules that will align liquid crystals after exposure with polarized light. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropically absorbing molecules exhibit absorption of about from 150 to 2000 nm. The anisotropically absorbing molecules of the optical alignment layer can be covalently bonded within a main chain polymer, they can be covalently bonded as side groups to a main polymer chain, they can be present as nonbonded solutes in a polymer, or they can be in the adjacent liquid crystal layer as a solute and adsorbed on the surface of a normal alignment layer to give an optical alignment layer.

Preferred optical alignment layers have absorbance maxima of about from 150 to 1600 nm. More preferable optical alignment layers have absorbance maxima of about from 150 to 800 nm. Most preferable optical alignment layers for the present invention have absorbance maxima between 150 and 400 nm and especially between 300 and 400 nm.

Anisotropically absorbing molecules useful in preparation of optical alignment layers are the dichroic arylazo, di(arylazo), tri(arylazo), tetra(arylazo), penta(arylazo), anthraquinone, mericyanine, methine, 2-phenylazothiazole, 2-phenylazobenzthiazole, stilbene, 1,4-bis(2-phenylethenyl) benzene, 4,4'-bis(arylazo)stilbenes, perylene and 4,8-diamino-1,5-napthoquinone dyes. Other useful anisotropically absorbing materials are the liquid crystal coupled dichroic dyes described in U.S. Pat. No. 5,389,285.

Preparation of the anisotropically absorbing materials listed above are well known as shown, e.g., by Huffman et al., in U.S. Pat. No. 4,565,424, Jones et al., in U.S. Pat. No. 4,401,369, Cole, Jr. et al., in U.S. Pat. No. 4,122,027, Etzbach et al., in U. S. Pat. No. 4,667,020, and Shannon et al., in U.S. Pat. No. 5,389,285.

Other anisotropically absorbing molecules useful in the preparation of colorless optical alignment layers are diaryl ketones having a ketone moiety or ketone derivative in conjugation with two aromatic rings. Specific families of these molecules useful in optical alignment layers are substituted benzophenones, benzophenone imines, phenylhydrazones, and semicarbazones. Specific benzophenone derivatives preferred in optical alignment layers for the process of this invention are benzophenone, 4,4'-diaminobenzophenone, 4,4'-bis(trifluoromethyl) benzophenone, 3,4'-bis(trifluoromethyl)benzophenone, and 3,3'-bis(trifluoromethyl)benzophenone. The benzophenone and 4,4'-trifluoromethylbenzophenone imines derived from n-octadecylamine, 4-hexyloxyaniline and 4-octadecyloxyaniline are also preferred. The phenylhydrazones of benzophenone, 4,4'-bis(trifluoromethyl) benzophenone, 3,4'-bis(trifluoromethyl)benzophenone, 3,3'-bis(trifluoromethyl)benzophenone, derived from condensation with phenylhydrazine; and the 2,4-diaminophenylhydrazones of benzophenone, 4,4'-bis (trifluoromethyl)benzophenone, 3,4'-bis(trifluoromethyl) benzophenone, and 3,3'-bis(trifluoromethyl)benzophenone, derived from the chemical reduction of the corresponding 2,4-dinitrophenylhydrazones are also preferred in optical alignment layers for the present invention.

Preferred anisotropically absorbing molecules for optical alignment layers are arylazo, poly(arylazo), stilbene and diaryl ketone derivatives. Arylazo, stilbene and diaryl ketone derivatives are the most referred dyes for optical alignment layers having absorbance maxima of about from 150 to 400 nm. Poly(arylazo) dyes are most preferred for optical alignment layers having absorbance maxima of about from 400 to 800 nm. A most preferred poly(azo) dye is diazodiamine A; a most preferred stilbene dye is 4,4'-diaminostilbene, B; a most preferred arylazo dye is monoazodiamine C (Table 1). The preparation of the dye A is described in U.S. Pat. No. 5,389,285; synthesis of dye C is described in the examples; and 4,4'-diaminostilbene is commercially available from Aldrich Chemical Co., Milwaukee, Wis., as the dihydrochloride salt.

Diaryl ketone tetracarboxylic dianhydrides are especially useful and preferred as anisotropically absorbing molecules. Preferred diaryl ketone tetracarboxylic dianhydrides are further described in greater detail infra in the discussion of polyimides.

Optical alignment layers used in the process of this invention also comprise hydrophobic moieties. "Hydrophobic moieties" refer to functional groups that impart strong water imicibility and high surface tension properties to materials. The hydrophobic moieties are usually, but not exclusively, covalently bonded to a polymer that also acts as a matrix or carrier for the anisotropically absorbing molecules that make up the optical alignment layer. Most notable hydrophobic moieties are fluorinated and partially fluorinated alkyl chains and long chain aliphatic hydrocarbons. Common hydrophobic moieties containing fluorinated and partially fluorinated alkyl chains, for instance, are monovalent 1H, 1H-pentadecafluoro-1-octyloxy and 11H-eicosafluoroundecanoyl groups, which are readily available from commercial materials or well known syntheses. Common hydrophobes containing long aliphatic hydrocarbon chains are the monovalent hexadecyl, hexadecyloxy, octadecyl, and octadecyloxy groups and the divalent hexadecylmethylene and octadecylmethylene groups.

Methods for incorporating hydrophobic moieties into many polymer materials are well known. Examples of polymers having hydrophobic moieties that are useful as matrices for optical alignment layers are poly(methyl methacrylate) and poly(methyl acrylate) copolymers containing various loadings of fluoroalkyl methacrylates and fluoroalkyl acryaltes such as 1H,1H,11H-eicosafluoroundecyl methacrylate, for example.

The polyamic acids and the corresponding polyimides are prepared from a combination of at least one monoamine, at least one diamine and at least one tetracarboxylic dianhydride. The monoamines which can be used in the present invention include those of the general formula $X_1$—$(CF_2)_p$—$(CH_2)_n$—$X$—$Ar$—$NH_2$, wherein the elements are as defined above. The monoamine can be prepared by the process described below.

Generally, as described in Estes et al., U.S. Pat. No. 5,186,985, a monoamine would be used only as an end-capping entity, and therefore limit necessarily the length of the molecule. However, for use in optical alignment processes, lower molecular weight polymers offer the advantage of higher mobility. Thus, the probability of achieving a desired photochemical reaction upon irradiation with polarized light increases.

Synthesis of monoamines

Monoamines of the above formula are readily available by reduction of the corresponding nitro derivatives with tin (II) chloride or by catalytic reduction with hydrogen and 5% palladium on carbon.

The nitro intermediates are readily available by nucleophilic displacement of 4-fluoronitrobenzene by a variety of monofunctional fluorinated alcohols and amines. Specific conditions for this reaction are outlined in the experimentals below. However, in general, a fluorinated alcohol or amine is stirred with the 4-fluoronitrobenzene in a polar aprotic solvent such as dimethylformamide, N-methylpyrrolidone or dimethylacetamide, in the presence of an organic or inorganic base such as triethylamine, potassium carbonate or potassium hydroxide. Usually heating to 80° C. will facilitate the reaction.

Monofunctional fluorinated alcohols are commercially available. For instance, 1 H, 1H,5H-octafluoro-1-pentanol, 1H, 1H,7H-perfluoro-1-heptanol, 1H,1H-perfluoro-1-octanol, 1H,1H,2H,2H-perfluoro-1-octanol, 1H,1H,2H,2H-perfluoro-1-decanol 1H,1H,2H,2H-perfluoro-1-dodecanol, 1H,1H,2H,2H-perfluoro-9-methyl-1-decanol are available from PCR Inc., Gainesville Fla., 32602 or Oakwood Products, Inc., West Columbia, S.C. 29169. Other monofunctional fluorinated alcohols are readily available by well known synthetic procedures. For instance, 1H,1H-perfluoro-1-tetradecanol, 1H, 1H-perfluoro-1-dodecanol, 1H,1H-perfluoro-1-decanol, 1H,1H,-perfluoro-1-nonanol, 1H,1H, 9H-perfluoro-1-nonanol, 1H,1H-perfluoro-1-heptanol are available by reduction of the corresponding acids or acid chlorides with potassium borohydride according to the procedure of Bilibin, et al. in Macromol. Chem. Phys., 197, 1021–1029, (1996). Alternatively, a mixture of sodium borohydride and aluminum chloride can be used to accomplish the reduction to the alcohol. Other fluorinated alcohols are available by the known radical addition reaction of perfluoroiodides to ω-alkene-1-ols as described in Wang, et al., J. Polym. Prepr. (Am Chem. Soc., Div. Polym. Chem.), 37 #2, 815 (1996) or Hopken, et al., New Polym. Mater., 2, 339.

A monofunctional fluorinated amine commercially available is 1H,1H-perfluoro-1-octylamine. Other monofunctional fluorinated amines are readily available by well known synthetic procedures. For instance, the ethyl esters of the fluorinated acids listed above are readily converted to amides by treatment with ammonia or primary amines. The amides can be readily reduced with diborane in tetrahydrofuran to produce primary and secondary amines. For instance, 1H,1H-perfluoro-1-tetradecylamine, 1H, 1H-perfluoro-1-dodecylamine, 1H, 1H-perfluoro-1-decylamine, 1H,1H,-perfluoro-1-nonylamine, 1H,1H,9H-perfluoro-1 -nonylamine, 1H,1H-perfluoro-1-heptylamine are available by reduction of the corresponding primary amides. N-methyl-1H,1H-perfluoro-1-tetradecylamine, N-methyl-1H,1H-perfluoro-1-dodecylamine, N-methyl-1H, 1H-perfluoro-1-decylamine, N-methyl-1H,1H,-perfluoro-1-nonylamine, N-methyl-1H,1H,9H-perfluoro-1-nonylamine, N-methyl-1H,1H-perfluoro-1-heptylamine are available by reduction of the corresponding N-methyl amides.

The examples of the invention use a fluorinated monoamine that was prepared by synthesis. 4-(1H,1H-perfluorooctyloxy)benzeneamine was made by the following procedure:

A mixture of 4-fluoronitrobenzene (2.2 g, 15.6 mmol), 1H,1H-perfluorooctanol (5.95 g, 14.9 mmol), potassium carbonate (2.35 g, 17.0 mmol) in dimethylacetamide (20 mL) and toluene (20 mL) was heated to reflux with a Dean Stark apparatus for 25 h. The mixture was cooled, diluted with water and extracted with ethyl ether. The extracts were washed with water, dried ($MgSO_4$), and concentrated to an oil (7.0 g). The oil was taken up in ethanol (60 mL) with tin chloride dihydrate (12.12 g, 54 mmol) and heated for 4 hr at 60° C. The mixture was poured into ice water, basified with potassium hydroxide (9.0 g) and extracted with ether-tetrahydrofuran (2:1). The extracts were washed with brine (3 times), dried ($MgSO_4$), and concentrated to an oil. Chromatography on silica gel was followed by recrystallization from hexane-ether to give crystals (3.0 g, mp 49.1–50.2° C).

Aromatic diamines substituted with hydrophobic moieties are especially useful and preferred as hydrophobic moieties in the synthesis of polyimides for optical alignment layers. Preferred hydrophobic diamines are further described infra in the discussion of polyimides.

Preferably, anisotropically absorbing molecules and hydrophobic moieties are covalently bonded to polymers. For instance, poly(amic acid)s, which are precursors to polyimides, can be prepared with anisotropic absorbing materials covalently bonded into the poly(amic acid) polymer chain. This typically is accomplished by mixing of dianhydride and diamines, including the anisotropically absorbing molecules as one of the two reactive components. For instance, 4,4'-diaminostilbene is an anisotropically absorbing molecule that also can act as a reactive diamine in polyimide synthesis. 3,3'4,4'-benzophenonetetracarboxylic anhydride is an anisotropically absorbing molecule that also can act as a reactive dianhydride in polyimide synthesis. Allowing the diamines and dianhydrides to polymerize in a solvent such as N-methylpyrolidone or tetrahydrofuran provides a prepolymer solution that is then coated on substrates and oven baked to give the final polyimide optical alignment layers.

Alternatively, optical alignment layers can have anisotropically absorbing molecules present as nonbonded solutes dissolved in a polymer containing hydrophobic moieties. These are referred to as guest-host optical alignment layers. They are prepared by coating on substrates a thin layer of organic material containing the anisotropically absorbing molecules. Typically, the anisotropically absorbing molecules are placed in solution along with a polymeric material. The solution is then coated on substrates using, typically, a spin casting technique. The coatings are then oven baked to remove residual solvent and perform the final cure.

Alternatively, optical alignment layers are prepared by coating conventional alignment layers such as a hydrophobic polyimide on the substrates. The anisotropically absorbing molecules are dissolved in a liquid crystal medium to give a guest-host mixture. When the guest-host mixture containing anisotropically absorbing molecules is allowed to contact a conventional alignment layer an optical alignment layer is formed.

Alternatively, optical alignment layers are prepared by coating conventional alignment layers such as hydrophobic polyimide on the substrates and anisotropically absorbing molecules are dissolved in a solvent. When the solution containing anisotropically absorbing molecules is coated on the conventional alignment layer an optical alignment layer is formed.

Preferred polymers for optical alignment layers of this invention are polyimide polymers. The preparation of polyimides is described in "Polyimides", D. Wilson, H. D. Stenzenberger, and P. M. Hergenrother Eds., Chapman and Hall, New York (1990). Typically, polyimides are prepared by the condensation of one equivalent of a diamine component with one equivalent of a dianhydride component in a polar solvent to give a poly(amic acid) prepolymer intermediate. Typical solvents used in the condensation reaction are N-methyl-pyrrolidone (NMP), dimethylacetamide (DMAc), dimethylformamide (DMF), dimethylsulfoxide (DMSO), butyl cellosolve, ethylcarbitol, γ-butyrolactone, etc. The poly(amic acid) is typically formulated to give a 1 to 30 wt % solution. The condensation reaction is usually performed between room temperature and 150° C. The prepolymer solution is coated onto a desired substrate and thermally cured at between 180 and 300° C. to complete the imidization process. Alternatively, the poly(amic acid) prepolymer is chemically imidized by the addition of a dehydrating agent to form a polyimide polymer. Examples of chemical imidization reagents are organic anhydrides such as acetic anhydride and trifluoroacetic anhydride in combination with organic bases such as triethyl amine and pyridine. Other chemical imidization reagents are ethylchloroformate and triethylamine, thionyl chloride, oxalyl chloride, acetyl chloride and dicyclohexylcarbodiimide. Chemical imidizations are performed between room temperature and 150° C. Chemical imidization requires that the resulting polyimide be soluble in a solvent for further processing. Achieving solubility often requires polyimides to be specially formulated for chemical imidization. The chemically imidized polyimide solution is coated onto a substrate and heated to remove solvent, but no high temperature cure is required. Preferred compositions of this invention are chemically imidized polyimides.

Especially useful in the process of the invention is a polyimide polymer that is the condensation reaction product of hydrophobic diamines and dianhydrides. Preferred is a polyimide polymer that is a homopolymide or a copolyimide of at least one tetracarboxylic dianhydride and at least one hydrophobic diamine, which comprises at least one structural element of the formula I:

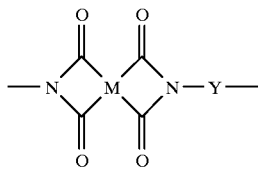

wherein Y is a divalent radical selected from the formula II and III

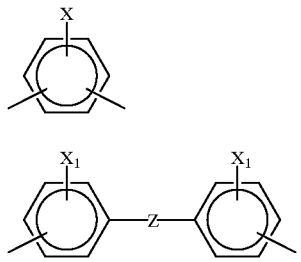

wherein Z is selected from the group consisting of —S—, —O—, —SO$_2$—, —CH$_2$—, —C(CF$_3$)$_2$—, —C(O)—, —CH$_2$CH$_2$—, —NR— and a covalent bond wherein R is a C$_1$–C$_4$ hydrocarbon chain; X is independently selected from R$_1$, —O—R$_1$, —S—R$_1$, —N(R$_2$)—R$_1$; wherein R$_1$ is independently selected from C$_4$–C$_{20}$ perfluorinated alkyl chain, C$_4$–C$_{20}$ partially fluorinated alkyl chain, and C$_{10}$–C$_{20}$ hydrocarbon chain; X$_1$ is independently selected from X and H; R$_2$ is independently selected from H, C$_1$–C$_9$ hydrocarbon chain and R$_1$; and wherein M is a tetravalent organic radical derived from said tetracarboxylic dianhydride containing at least two carbon atoms, no more than two carbonyl groups of the dianhydride being attached to any one carbon atom of the tetravalent radical.

Diamines useful in this invention to induce a finite pre-tilt of a liquid crystal medium as well as provide good alignment uniformity are listed in Table 2. Preferred hydrophobic diamines have the structure

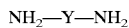

wherein Y is as described above. Specific hydrophobic diamines that are preferred in this invention are 4-(1H,1H-pentadecafluoro-1-octyloxy)-1,3-benzenediamine (8) and 4-(1H,1H,11H-eicosafluoro-1-undecyloxy)-1,3-benzenediamine (9). Specific diamines having hydrocarbon chains that are preferred are 4-(1-octadecyloxy)-1,3-benzenediamine (10), 4-(1-hexadecyl-1,3-benzenediamine and 2-(1-octadecyloxy)-1,4-benzenediamine (12).

Specific hydrophobic diamines useful in this invention are readily available by synthesis. The dinitro compounds corresponding to diamines 8 and 9 are prepared by nucleophilic displacement of halogen from 1-halo-2,4-dinitrobenzenes with 1H, 1H-pentadecafluoro-1-octanol and 1H,1H,11H-eicosafluoro-1-undecanol, respectively, which are available from PCR Inbc. (Gainesville, Fla. 32602). They are chemically reduced to diamines to provide the diamines 8 and 9 as described by Ichino, et al, in J. Poly. Sci., 28, 323 (1990). Dinitro compounds corresponding to diamines 10–13 are prepared by alkylation of 2,4-dinitrophenol or 2,5 dinitrophenol with alkyl bromides in dimethylformamide/sodium carbonate at 90-100 C. The dinitro compound corresponding to diamine 14 is prepared by nitration of n-octylbenzene. The dinitro compounds corresponding to diamines 15 and 16 are prepared from 1-chloro-2,4-dinitrobenzene as described in U.S. Pat. No. 4,973,429. The dinitro compounds are reduced to the corresponding diamines 10–16 chemically with tin (II) chloride/ethanol or catalytically with hydrogen and palladium/carbon.

Other diamines that can be used in combination with the hydrophobic diamines described above can very widely. Specific examples include the trifluoromethyl substituted diamines 1–7 and the lower hydrocarbon homologs 11, 13, and 14 of Table 2. Aromatic diamines which can be used include p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane; and aliphatic diamines such as tetramethylenediamine and hexamethylene diamine. Further, diaminosiloxanes such as bis(3-aminopropyl)tetramethyldisiloxane can also be used. Such diamines may be used alone or in combination as a mixture of two or more.

Other diamines that are preferred in the process and polyimide compositions of the instant invention are diaminobenzophenones. Diaminobenzophenones are diaryl ketones and thus act as another source of photoactive species in the process. In copolyimides incorporating both diamino and dianhydride derivatives of diaryl ketones, a larger concentration of active chromophore can be achieved. Preferred diaminobenzophenones for copolyimide compositions of the instant invention is 4,4'-diaminobenzophenone and 3,4'-diaminobenzophenone.

Preferably, the hydrophobic diamines comprise about from 1.0 to 50 mol % of the diamine component, and most preferably the hydrophobic diamines comprise about from 1.0 to 15 mol % of the diamine component. Loadings of the hydrophobic diamine greater than about 50 mol % of the diamine component tend to give pre-tilts greater than 30 degrees.

In a preferred process of this invention the polyimide polymer is a copolyimide, which additionally comprises at least one structural element of formula:

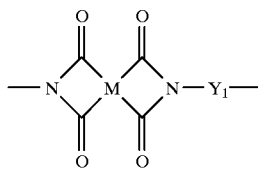

wherein $Y_1$ is a divalent organic radical having at least two carbon atoms other than Y; M is as described above; and wherein the ratio of structural elements of formula I and Ia are about from 1:99 to 99:1.

The tetracarboxylic dianhydrides useful in forming polyimides for the invention have the structural formula:

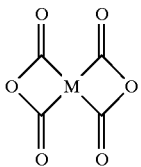

wherein M is a tetravalent organic radical containing at least two carbon atoms, no more than two carbonyl groups of the dianhydride being attached to any one carbon atom of the tetravalent radical.

Specific examples of the tetracarboxylic dianhydride component include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2'3'-biphenyltetracarboxylic dianhydride, bis(3,4-dicarboxyphenyl)ether dianhydride, 3,3'4,4'-benzophenonetetracarboxylic dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-cyclobutanetetracarboxylic dianhydride, 1,2,3,4-butanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

Diaryl ketone tetracarboxylic dianhydrides especially useful for the invention are those having the following structure:

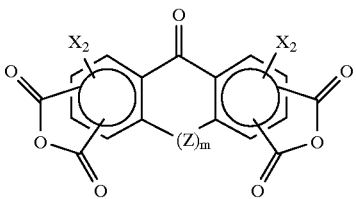

wherein $X_2$ is independently selected from the group consisting of H, CL, F, Br, $R_3$ and $R_3O$, wherein $R_3$ is independently selected from $C_1$–$C_3$ perflourinated alkyl chain, $C_1$–$C_3$ partially fluorinated alkyl chain and $C_1$–$C_8$ hydrocarbon chain; m is 1 or 0; and Z is selected from the group consisting of —S—, —O—, —SO$_2$—, —CH$_2$—, —C(CF$_3$)$_2$—, —C(O), —CH$_2$CH$_2$—, —NR— and a covalent bond wherein R is a $C_1$–$C_4$ hydrocarbon chain. The more preferred diaryl ketones are 3,3',4,4'-benzophenonetetracarboxylic dianhydride (D1) and 2,2'-dichloro-4,4',5,5'-benzophenone tetracarboxylic dianhydride (D2). The most preferred benzophenone tetracarboxylic dianhydride for this invention is 3,3',4,4'-benzophenonetetracarboxylic dianhydride (D1). Other related photosensitive diaryl ketone dianhydrides described by Pfeifer, et al., in U.S. Pat. No. 4,698,295, herein incorporated by reference, are useful alternatives to the benzophenonetetracarboxylic dianhydrides in the process of this invention.

Specific benzophenonetetracarboxylic dianhydrides preferred in this invention are readily available from commercial sources or synthesis. For instance, 3,3',4,4'-benzophenonetetracarboxylic dianhydride (D1) is available from Aldrich Chemical Co., Inc. (1001 W. St. Paul Ave., Milwaukee, Wis. 53233). 2,2'-Dichloro-4,4',5,5'-benzophenone tetracarboxylic dianhydride (D2) is available from 4-chloro-o-xylene by Friedel-Crafts acylation with oxalyl chloride to give 2,2'dichloro-4,4',5,5',-tetramehtylbenzophenone, followed by oxidation with nitric acid and dehydration of the resulting tetracarboxylic acid as described by Falcigno, et al., J. Poly. Sci. 1992, 30, 1433.

"Alicyclic tetracarboxylic dianhydrides" refer to dianhydrides that are comprised either partially or in whole of saturated carbocyclic rings. The alicyclic tetracarboxylic dianhydrides impart useful solubility properties to polyimides comprising them. Alicyclic tetracarboxylic dianhydrides suitable for the invention are those listed in Table 3. Preferred alicyclic dianhydrides are 5-(2,5-dioxotetrahydro)-3-methyl-3-cyclohexene-1,2-dicarboxylic anhydride (D3), 2,3,5-tricarboxycyclopentaneacetic acid dianhydride (D4), cyclobutanetetracarboxylic acid dianhydride (D5) and 1,2,3,4-butanetetracarboxylic acid dianhydride (D7).

5-(2,5-Dioxotetrahydro)-3-methyl-3-cyclohexene-1,2-dicarboxylic anhydride (D3) is commercially available from Chriskev Co., Inc., 1,2,3,4-Cyclobutanetetracarboxylic acid is available from Aldrich Chemical Co., Inc., and can be readily converted to the dianhydride with oxalyl chloride. 2,3,5-Tricarboxycyclopentaneacetic acid dianhydride (D4) is available via synthesis by oxidation of dicyclopentadiene with nitric acid as described by Hession, et al., in British Patent 1,518,322 (1976). The synthesis of 1,2,3,4-cyclobutanetetracarboxylic dianhydride (D5) is described by Moore, et al., Chem. Mat., 1989, 1, 163. 1,2,3,4-butanetetracarboxylic acid dianhydride (D7) is available by treatment of the corresponding tetracarboxylic acid (Aldrich) with acetic anhydride. 5,5'-(1,1,3,3-Tetramethyl-1,3-disiloxanediyl)-bis-(norbomane-2,3-dicarboxylic anhydride) (D9) is available by hydrosilation of 5-norbomene-2,3-dicarboxylic anhydride with 1,1,3,3-tetramethyldisiloxane as described by Ryang, in U. S. Pat. No. 4,381,396. Bicyclo[2.2.1]heptanetetracarboxylic 2,3:5,6-dianhydride (D10) is available by synthesis from bicyclo [2.2.1]hept-5-ene-2,3-dicarboxylic anhydride as described by Matsumoto, et al., in Macromolecules 1995, 28, 5684. Bicyclo[2.2.2]oct-7-enetetracarboxylic 2,3:5,6-dianhydride (D11) is available by synthesis from 4-cyclohexene-1,2-dicarboxylic anhydride as described by Itamura, et al., in Macromolecules 1993, 26, 3490.

In preparing polyimides for optical alignment layers the molar ratio of amine to dianhydride usually is 1:1, but can vary between 0.8:1 to 1:1.2. The preferred ratio of amine to dianhydride is between 0.98:1 and 1:1.02. Most preferred is a 1:1 ratio of diamine to dianhydride. The monoamine can comprise about from 1 to 12 mol % of the amine component.

Another embodiment of this invention is a novel polyimide composition, derived from a diamine component and a dianhydride component, for generating pre-tilt in alignment of a liquid crystal medium comprising a copolyimide derived from at least one diaryl ketone tetracarboxylic dianhydride, at least one hydrophobic diamine and at least one alicyclic tetracarboxylic anhydride, which comprises at least two structural elements of the following formulas:

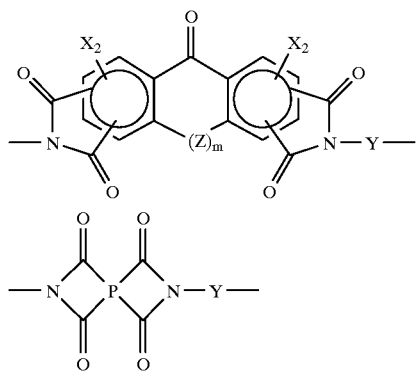

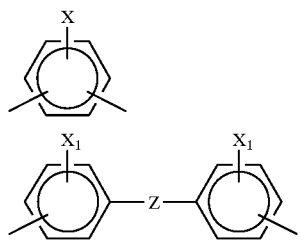

wherein Y is a divalent radical selected from the following formulas:

wherein Z is selected, independently, from the group consisting of —S—, —O—, —SO$_2$—, —CH$_2$—, —C(CF$_3$)$_2$—, —C(O)—, —CH$_2$CH$_2$—, —NR— and a covalent bond wherein R is a C$_1$–C$_4$ hydrocarbon chain; X is independently selected from R$_1$, —O—R$_1$, —S—R$_1$, —N(R$_2$)—R$_1$; wherein R$_1$ is independently selected from C$_4$–C$_{20}$ perflourinated alkyl chain, C$_4$–C$_{20}$ partially fluorinated alkyl chain, and C$_{10}$–C$_{20}$ hydrocarbon chain; X$_1$ is independently selected from X and H; R$_2$ is selected, independently, from H, C$_1$–C$_9$ hydrocarbon chain and R$_1$; X$_2$ is independently selected from the group consisting of H, CL, F, Br, R$_3$ and R$_3$O—, wherein R$_3$ is independently selected from C$_1$–C$_3$ perflourinated alkyl chain, C$_1$–C$_3$ partially fluorinated alkyl chain and C$_1$–C$_8$ hydrocarbon chain; m is 1 or 0; and P is a tetravalent organic radical derived from said alicyclic tetracarboxylic dianhydride containing at least four carbon atoms, no more than one carbonyl group of the dianhydride being attached to any one carbon atom of the tetravalent radical. Most preferred is a composition wherein the copolyimide comprises a ratio of structural elements of formula IV and V of 1:10 to 99:1.

Another preferred polyimide composition additionally includes at least one diaminobenzophenone, additionally comprising at least one structural element of the following formulas:

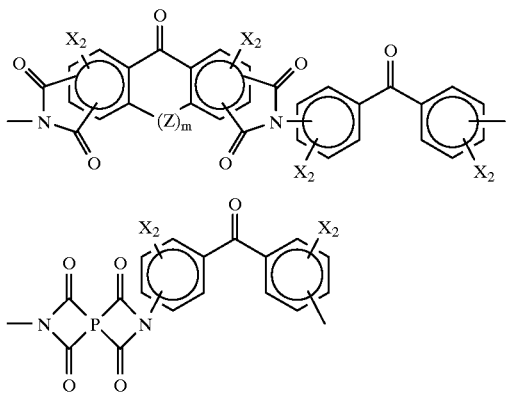

wherein Z, X$_2$, P and m are as described above.

Another embodiment of the invention is a polyimide composition, derived from a diamine component and a dianhydride component, for generating pre-tilt in alignment of a liquid crystal medium comprising a copolyimide derived from at least one diaryl ketone tetracarboxylic dianhydride, at least one hydrophobic diamine and at least one diaminobenzophenone, which comprises at least two structural elements of the following formulas:

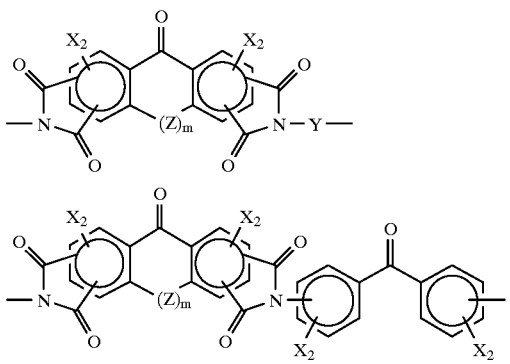

wherein Y, Z, X, X$_1$, X$_2$, and m are as previously described.

Another embodiment of the invention is a polyimide composition, derived from a diamine component and a dianhydride component, for generating pre-tilt in alignment of a liquid crystal medium comprising a copolyimide derived from at least one alicyclic tetracarboxylic dianhydride, at least one hydrophobic diamine and at least one diaminobenzophenone, which comprises at least two structural elements of the following formulas:

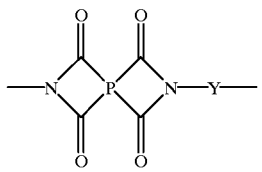

-continued

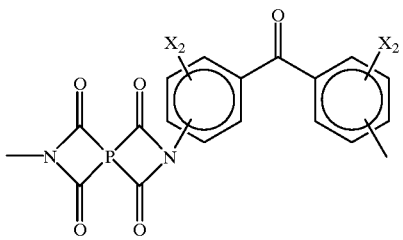

wherein Y, Z, X, $X_1$, $X_2$, P and m are as previously described.

Another embodiment of the invention is polyimide composition, derived from a diamine component and a dianhydride component, for generating pre-tilt in alignment of a liquid crystal medium comprising a copolyimide derived from at least one diaryl ketone tetracarboxylic dianhydride, at least one hydrophobic diamine and at least one diamine derived from a radical $Y_2$, comprising at least one structural element of the following formulas:

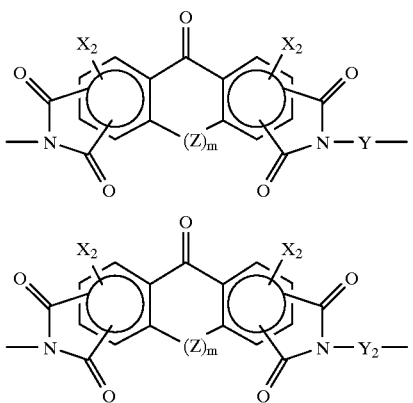

wherein Y, Z, X, $X_1$, $X_2$, P and m are as previously described and $Y_2$ is a divalent radical selected from the following formulas:

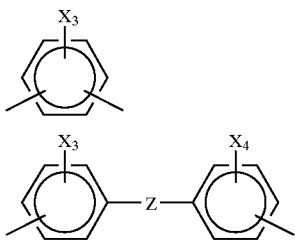

wherein $X_3$ is independently selected from $C_1$–$C_3$ perfluorinated alkyl chain, partially fluorinated alkyl chain or —$OCF_3$; and $X_4$ is independently selected from $X_3$ and H.

In all the preferred compositions described above there are general preferences for certain functionality. A most preferred diaryl ketone tetracarboxylic anhydride is 3,3',4,4'-benzophenonetetracarboxylic dianhydride. Preferred alicyclic tetracarboxylic acid dianhydrides are 5-(2,5-dioxotetrahydro)-3-methyl-3-cyclohexene-1,2-dicarboxylic anhydride, 2,3,5-tricarboxycyclopentaneacetic acid dianhydride, 1,2,3,4-butanetetracarboxylic acid dianhydride and cyclobutanetetracarboxylic acid dianhydride. Most preferred are 5-(2,5-dioxotetrahydro)-3-methyl-3-cyclohexene-1,2-dicarboxylic anhydride, 2,3,5-tricarboxycyclopentaneacetic acid dianhydride and 1,2,3,4-butanetetracarboxylic acid dianhydride which give useful solubility properties to the polyimides. Most preferred hydrophobic diamines are selected from the group consisting of 4-(1H,1H-pentadecafluoro-1-octyloxy)-1,3-benzenediamine, 4-(1H, 1H, 11H-eicosafluoro-1-undecyloxy)-1,3-benzenediamine, 4-(1-octadecyloxy)-1,3-benzenediamine, 4-(1-hexadecyl)-1,3-benzenediamine and 2-(1-octadecyloxy)-1,4-benzenediamine. 4,4'-Diaminobenzophenone is a most preferred diaminobenzophenone. Most preferably radical $Y_2$ is derived from a diamine selected from the group consisting of 2-(trifluoromethyl)-1,4-benzenediamine (1), 5-(trifluoromethyl)-1,3-benzenediamine (2), 2,2'-bis(trifluoromethyl)benzidene (7), 2,2'-bis(trifluoromethoxy)benzidene (6) and 3,3'-bis(trifluoromethyl)benzidene (5).

Preferably, the hydrophobic diamines comprise 1.0 to 50 mol % of the diamine component, and most preferably the hydrophobic diamines comprise 1.0 to 15 mol % of the diamine component. As will be readily appreciated by those skilled in the art, there is variation in the performance among the many embodiments of the present invention. Most basically, while the required anisotropically absorbing molecules and hydrophobic moieties impart the desired pre-tilt at any concentration, the degree of the effect will be greater with greater concentrations. Similarly, there is a variation in the performance realized between specific anisotropically absorbing molecules and hydrophobic moieties. For example, among the diamines detailed in Table 2, despite a similarity in structure, diamine 10 has been found to yield superior performance to diamine 12, and diamine 8 has been generally found to be particularly satisfactory.

The compositions of the invention provide a combination of high solubility and optical alignment performance (a finite pre-tilt, low energy threshold, high quality alignment & transparency to visible light) that is very desirable for the fabrication of liquid crystal display elements.

To prepare the optical alignment layers of this invention poly(amic acid) solutions or preimidized polyimide solutions polymer solutions are coated onto desired substrates. Coating is usually accomplished with 2 to 30 wt % solids. Any conventional method may be used to coat the substrates including brushing, spraying, spin-casting, dipping or printing. The coated substrates are heated in an oven under an inert atmosphere, for instance nitrogen or argon, at elevated temperature usually not exceeding 300° C. and preferably at or below 180° C. for 1 to 12 hours, preferably for 2 hours or less. The heating process removes the solvent carrier and may be used to further cure the polymer. For instance, the poly(amic) acid films are thermally cured to generate polyimide films.

The optical alignment layers are exposed to polarized light to induce alignment of liquid crystals. By "polarized light" we mean light that is elliptically polarized such that the light is more polarized along one axis (referred to as the major axis) versus the orthogonal axis (referred to as the minor axis). The preferred polarization is linearly polarized light where the light is polarized mostly along one axis (the major axis) with little or no polarization component along the minor axis. In this invention the polarized light has one or more wavelengths of about from 150 to 2000 nm and preferably about from 150 to 1600 nm and more preferably about from 150 to 800 nm. Most preferably, the polarized light has one or more wavelengths of about from 150 to 400 nm and especially about from 300 and 400 nm. A preferred source of light is a laser, e.g., an argon, helium neon, or helium cadmium. Other preferred sources of light are mercury arc, xenon lamps, deuterium and quartz tungsten halogen lamps, and black lights in combination with a polarizer. Polarizers useful in generating polarized light from nonpolarized light sources are interference polarizers made from dielectric stacks, absorptive polarizers and reflective polarizers based on Brewster reflection. With lower power lasers or when aligning small alignment regions, it may be necessary to focus the light beam onto the optical alignment layer.

Another source of polarized light is light from a mercury arc, xenon lamp, deuterium and quartz tungsten halogen lamp, or black light that is unpolarized at its source, but incident upon an optical alignment layer at an oblique angle. For unpolarized light incident at an oblique angle onto an interface, the obliqueness of the incident angle causes the unpolarized light to be decoupled into a combination of three linear polarizations (see, for instance, R. W. Wood, *Physical Optics, 3rd Ed.,* p. 397, Optical Society of America, Washington D.C., 1988). Similarly, another source of polarized light is circularly polarized light that is incident upon an optical alignment layer at an oblique angle.

Oblique incidence is defined as having the direction of the incident light predominately at an angle other than along a normal to the plane of the substrate. Oblique incidence and incident along the normal is not limited to collimated light. For example, focused light with the cone of light directions symmetric about the normal to the substrate is still considered incident normal to the substrate. However, the same focused light with a cone of light directions symmetric about an axis that makes an angle other than normal to the substrate would be considered oblique incidence.

By "exposing" is meant that polarized light is applied to the entire optical alignment layer or to a portion thereof. The light can be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer(s) with the liquid crystal medium. Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. For example, materials that possess high glass transition temperatures can have higher energy density requirements for optical alignment. Whereas, material systems designed to have a low glass transition temperature prior to exposure can have lower energy density requirements. A preferred range of exposure energy is about from 0.001 to 2000 $J/cm^2$. More preferred is the range of about from 0.001 to 100 $J/cm^2$ and most preferred range of exposure energy is about from 0.001 to 5 $J/cm^2$. Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, may be further impacted by heating, beyond that inherent in the "exposing" step. Additional heating during the exposing step may be accomplished by conduction, convection or radiant heating, or by exposure to unpolarized light. Additional heating may increase the mobility of the molecules during exposure and improve the alignment quality of the optical alignment layer. Additional heating is not a requirement of the process of the invention but may give beneficial results.

A preferred method of exposing comprises exposing at least one optical alignment layer to polarized light at an oblique angle of incidence. With this method of exposure, the liquid crystal medium, in the absence of flow effects, exhibits a thermally stable pre-tilt determined by the direction of the oblique angle of incidence of the polarized light as described infra.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size.

Another preferred method of exposing comprises exposing at least one optical alignment layer to polarized light at an oblique angle of incidence and exposing the same optical alignment layer to polarized light at a second angle of incidence. In this multi-step process, the direction of linear polarization may remain the same or change in each exposure step. In a preferred process, the exposure at an oblique angle of incidence and the exposure at a second angle of incidence are performed with polarized light of different directions of polarization.

All the multiple exposure steps described herein can be performed simultaneously or in series. One example of simultaneous exposure is exposing with unpolarized light at an oblique angle of incidence which is a combination of three linear polarizations. Another example of simultaneous exposure is exposing polarized light at an oblique angle of incidence with a polarization at any direction other than 90 to the plane of incidence. A third example of simultaneous exposing is exposure with two or more polarized light beams with two or more directions of polarization and two or more angles of incidence simultaneously.

A preferred method of dual exposing comprises a two step process of:

(a) exposing at least one optical alignment layer to polarized light at a normal incidence, and (b) exposing the optical alignment layer to polarized light at an oblique incidence.

Another preferred method of dual exposing comprises a two step process of:

(a) exposing said optical alignment layer to polarized light of a first direction of linear polarization of the incident light beam, and (b) exposing said optical alignment layer to polarized light of a second direction of linear polarization of the incident light beam.

Another preferred method of dual exposing comprises a two step process of:

(a) exposing said optical alignment layer to polarized light of a first direction of linear polarization of the incident light, and (b) exposing said optical alignment layer to polarized light of a second direction of linear polarization of the incident light, at an oblique incidence.

As liquid crystal substances used for liquid crystal display elements, nematic liquid crystal substances, ferroelectric liquid crystal substances, etc. are usable. Useful liquid crystals for the invention described herein include those described in U. S. Patent 5,032,009 and new superfluorinated liquid crystals exemplified by ZLI-5079, ZLI-5080, ZLI-5081, ZLI-5092, ZLI-4792, ZLI-1828, MLC-2016, MLC-2019, MLC-6252, and MLC-6043 available from EM Industries, Hawthorne N.Y. Also useful are guest-host formulations prepared with all types of liquid crystals and anisotropically absorbing dyes as described in U.S. Pat. No. 5,032,009. Also useful in this invention are nematic and ferroelectric liquid crystals that are disclosed in U.S. Pat. No. 5,447,759 entitled "Liquid Crystal Alignment Film and Liquid Crystal Display Elements," hereby incorporated by reference.

Chiral dopants are often added to these liquid crystals to induce a twist in one direction in the liquid crystal medium. Left and right handed chiral dopants are available. Typical examples are ZL 1-811, S-1011 and R-1011, all available from EM Industries.

Other liquid crystals useful in this invention include the polymerizable liquid crystals as described in U.S. Pat. No. 5,073,294; and the liquid crystal difunctional methacrylate and acrylate monomers as described in U.S. Pat. No. 4,892,392. Both patents are hereby incorporated by reference.

Still other liquid crystals useful in this invention include liquid crystal polymers as described in U.S. Pat. No. 5,382,548 which is hereby incorporated by reference. These polyester and polyurethane liquid crystal polymers have low rotational viscosities between their glass transition ($T_g$) and their isotropic transition ($T_{ni}$) and readily respond to surface aligning forces.

Preferred liquid crystals for the invention are nematic liquid crystals, ferroelectric liquid crystals, polymerizable nematic liquid crystals and nematic liquid crystalline polymers. Especially preferred liquid crystals for the invention are nematic liquid crystals and polymerizable nematic liquid crystals. Specific families of nematic liquid crystals that are preferred are the 4-cyano-4'-alkylbiphenyls, 4-alkyl-(4'-cyanophenyl)cyclohexanes and the superflourinated liquid crystal mixtures selected from the group of ZLI-5079, ZLI-5080, ZLI-5081, ZLI-5092, ZLI-4792, ZLI-1828, MLC-2016, MLC-2019, MLC-6252, and MLC-6043 available from EM Industries, Hawthorne N.Y.

Applying a liquid crystal medium to the optical alignment layer can be accomplished by capillary filling of a cell, by casting of a liquid crystal medium onto an optical alignment layer, by laminating a preformed liquid crystal film onto an optical alignment layer or by other methods. Preferred methods are capillary filling of a cell and casting of a liquid crystal medium onto an optical alignment layer.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer. Additionally, optical alignment layers can be further processed by conventional alignment techniques such as mechanical buffing, either before or after the exposure step.

After the exposing step and applying the liquid crystal medium, heating the liquid crystal medium and cooling the liquid crystal medium is performed. Herein, the combination of steps of heating and cooling is referred to as the heating-cooling cycle.

By "heating" is meant that thermal energy is applied to the liquid crystal medium from any conventional source. Thermal energy sources included are radiant heaters, electric heaters, infrared lamps and convection ovens, and the like. The liquid crystal medium is heated sufficiently to raise the temperature of the medium above the isotropic point. The isotropic point is the liquid crystal-isotropic transition, that is, the discreet temperature at which the medium is transformed from an ordered phase into a randomly isotropic liquid. Heating can be performed in a series of steps or at a constant rate of increase. Preferably, heating is performed to about from 0.01 to 60° C. above the medium's isotropic point especially for a period of about from 1 second to 8 hours. Most preferably, the medium is heated at a temperature of about from 1 to 50° C. above the medium's isotropic point for a period of about from 1 minute to 2 hours.

By "cooling" is meant that thermal energy is removed from the heated liquid crystal medium by any conventional method. Conventional methods include removing the source of thermal energy and allowing the medium to equilibrate to room temperature; quenching the medium by placing it in contact with a cooler medium such as a water bath; or gradually decreasing the amount of thermal energy delivered to the medium. Cooling is performed on the liquid crystal medium to reduce the temperature of the liquid crystal medium below the isotropic point. Cooling can be performed in a series of steps or at a constant rate. Preferably, cooling is performed at a constant or variable rate of about from 1000 to 0.01° C./min. Most preferably, cooling is performed at a constant or variable rate of about from 100 to 0.1° C./min for a period of about from 1 second to 8 hours.

The process of this invention can be used to make a novel liquid crystal display element, also of this invention. The liquid crystal display element of the present invention is composed of an electrode substrate having at least one optical alignment layer of the present invention, a voltage-impressing means and a liquid crystal material.

The exposed anisotropically absorbing molecules induce alignment of a liquid crystal medium at an angle + and −θ with respect to the direction of the polarization of the incident light beam and along the plane of the optical alignment layer. In addition, in the presence of the hydrophobic moieties, the exposed anisotropically absorbing molecules induce a pre-tilt at an angle Φ with respect to the plane of the optical alignment layer.

One skilled in the art will recognize that the process of the instant invention allows control of the alignment of a liquid crystal medium in any desired direction within the plane of the optical alignment layer by controlling the conditions of the polarized light exposure. Preferably, the liquid crystal medium is aligned at an angle + and −θ, where θ is equal to 90° with respect to the direction of polarization.

One skilled in the art will recognize that 0 to 90° pre-tilt is equivalent in magnitude to 180 to 90° pre-tilt, but with opposing directions. Preferred pre-tilts in the process are in the range of 1 to 30° and 179 to 150°. Most preferred pre-tilts are in the range of 2 to 15° and 178 to 165°.

A common way to assess pre-tilt is by direct measurement of the pre-tilt in a planar aligned or twisted nematic cell using the crystal rotation method of Baur, et al., Phys. Lett., (1976) 56A, 142. This method assumes that the pre-tilt throughout the thickness of the liquid crystal layer is a constant. Thus it gives an average value of pre-tilt. Those skilled in the art know that this measurement technique requires construction of anti-parallel planar or non-splay twisted nematic cells to insure a uniform pre-tilt throughout the thickness of the cell. In the examples that follow twisted nematic cells with a non-splay configuration of the alignment layers is used to assess pre-tilt angle.

In some cases, flow effects established while applying the liquid crystal medium to the optical alignment layer appear to dominate and determine the pre-tilt direction in the absence of a heating-cooling cycle. However, when a heating-cooling cycle according to the preferred embodiments of the present invention is performed, the flow induced pre-tilt direction and the defects due to flow disappear and what remains is a thermally stable pre-tilt direction. The direction of this thermally stable pre-tilt is determined by that of the oblique angle of incidence of the polarized light in the exposing step. The resulting aligned liquid crystal medium exhibits a degree of uniformity superior to that obtained in the absence of the heating-cooling cycle.

The magnitude of the pre-tilt also is affected by the heating-cooling cycle of the completed liquid crystal device. The duration of the exposure to heat above the isotropic transition of the liquid crystal in the device lowers the pre-tilt magnitude which eventually stabilizes at a value below the initial pre-tilt value. By varying the time at elevated temperatures before cooling the sample, the magnitude of the pre-tilt can be changed between the initial value and the minimum value. In addition, the type of cooling cycle can also affect the magnitude of the pre-tilt. If the cooling from the elevated temperature above the isotropic to below the isotropic transition is performed slowly, the pre-tilt magnitude is observed to be smaller than if it is cooled quickly (quenched). As a result, the magnitude of the pre-tilt can be varied from its initial value to a minimum by decreasing the cooling rate. The magnitude of the pre-tilt determined by the heating - cooling cycle is stable at room temperature. This invention is demonstrated in the following examples, which are illustrative and not intended to be limiting. The examples of the invention use several hydrophobic diamines that were prepared by synthesis.

Hydrophobic diamine 10 was made by the following procedure:

A mixture of 2,4-dinitrophenol (85 wt %, 6.72 g, 31 mmol), octadecyl bromide (20.7 g, 62 mmol), sodium carbonate (6.57 g, 62 mmol) and dimethylformamide (31 mL) was heated to 100° C. under a nitrogen atmosphere for 22 hrs. The cooled mixture was diluted with water (200 mL), acidified with 10 N hydrochloric acid (50 mL) and extracted with ether. The extracts were washed with water and brine, and dried over magnesium sulfate. The solvent was removed and the solid recrystallized to give 1-octadecyloxy-2,4-dinitrobenzene (10.7 g, 79%): mp 63.5–64.0° C.

A mixture of 1-octadecyloxy-2,4-dinitrobenzene (3.99 g 9.15 mmol), tin(II) chloride dihydrate (23.93 g 106 mmol) and absolute ethanol (40 mL) was heated to 70° C. for 5 hrs. The cooled reaction mixture was poured into ice and basified with concentrated sodium bicarbonate aqueous solution. The mixture was extracted with diethyl ether and the extract dried over magnesium sulfate. The solvent was removed and the product purified by chromatography (silica gel) to give diamine 10 (0.58 g 17%): mp 82.1–83.0° C.

Hydrophobic diamine 12 was prepared by the following procedure:

A mixture of 1-octadecyloxy-2,5-dinitrobenzene (6.87 g, 15.7 mmol), tin(II) chloride dihydrate (35.5 g, 157.3 mmol) and absolute ethanol (70 mL) was heated to 70° C. for 5 hrs. The cooled reaction mixture was poured into ice and basified with concentrated potassium hydroxide aqueous solution. The mixture was extracted with diethyl ether and the extract dried over magnesium sulfate. The solvent was removed and the product purified by chromatography (silica gel) to give diamine 12 (5.2 g, 88%): mp 74.0–74.5° C.

Hydrophobic diamine 16 was prepared by the following procedure:

A mixture of 1-chloro-2,4-dinitrobenzene (Aldrich, 2.02 g, 10 mmol), sodium carbonate (1.27 g, 12 mmol), dioctadecylamine (Pfaltz & Bauer, 6.26 g, 12 mmol) and dry dimethylformamide (10 mL) was heated to 80–90° C. under a nitrogen atmosphere for 1 hr. The cooled mixture was diluted with water and extracted with ether. The extracts were washed with water and dried over magnesium sulfate. The solvent was removed and the solid recrystallized to give N,N-dioctadecyl-2,4-dinitrobenzenamine (6.0 g, 87%): mp 55.5–57.5° C.

A mixture of N,N-dioctadecyl-2,4-dinitrobenzenamine (11.8 g 17.2 mmol), 5% palladium on carbon (1.8 g, 50% water wet) and tetrahydrofuran (180 g) was hydrogenated at 55 psi and room temperature in a Parr shaker for 7 hrs. The mixture was filtered through celite and the solvent removed to give a solid. The solid was recrystallized from ethanol to give diamine 16 (7.47 g, 68%): mp 41.5–44.0° C.

TABLE 1

| Dye Designation | Structure |
| --- | --- |
| A | $H_2N-\langle\bigcirc\rangle-N=N-\langle\bigcirc\rangle(CH_3)-N=N-\langle\bigcirc\rangle(CH_3)(OCH_3)-NH_2$ |
| B | $H_2N-\langle\bigcirc\rangle-CH=CH-\langle\bigcirc\rangle-NH_2$ |

TABLE 1-continued

| Dye Designation | Structure |
|---|---|
| C | 4,4'-diamino-2,2'-bis(trifluoromethyl)azobenzene: $NH_2$–C$_6$H$_3$(CF$_3$)–N=N–C$_6$H$_3$(CF$_3$)–$NH_2$ |

TABLE 2

Diamines used in Polyimide Alignment Layers

| No. | Structure |
|---|---|
| 1 | 2,4-diamino-1-(trifluoromethyl)benzene |
| 2 | 3,5-diamino-1-(trifluoromethyl)benzene |
| 3 | 2,4-diamino-1-(trifluoromethyl)benzene (isomer) |
| 4 | 2,4-diamino-1-(trifluoromethoxy)benzene |
| 5 | 4,4'-diamino-2,2'-bis(trifluoromethyl)biphenyl |
| 6 | 4,4'-diamino-3,3'-bis(trifluoromethoxy)biphenyl |
| 7 | 4,4'-diamino-3,3'-bis(trifluoromethyl)biphenyl |
| 8 | 2,4-diamino-1-($OCH_2(CF_2)_7F$)benzene |
| 9 | 2,4-diamino-1-($OCH_2(CF_2)_{10}H$)benzene |
| 10 | 2,4-diamino-1-($OC_{18}H_{37}$)benzene |
| 11 | 2,4-diamino-1-($OC_8H_{17}$)benzene |
| 12 | 3,4-diamino-1-($OC_{18}H_{37}$)benzene |

TABLE 2-continued

Diamines used in Polyimide Alignment Layers

| No. | Structure |
|---|---|
| 13 | 2,5-diamino-(octyloxy)benzene (H$_2$N–C$_6$H$_3$(OC$_8$H$_{17}$)–NH$_2$) |
| 14 | 2,4-diamino-(octyl)benzene (H$_2$N–C$_6$H$_3$(C$_8$H$_{17}$)–NH$_2$) |
| 15 | N-octadecyl-1,2,4-triaminobenzene (H$_2$N–C$_6$H$_3$(NH–C$_{18}$H$_{37}$)–NH$_2$) |
| 16 | N,N-dioctadecyl-1,2,4-triaminobenzene (H$_2$N–C$_6$H$_3$(N(C$_{18}$H$_{37}$)$_2$)–NH$_2$) |

TABLE 3

Alicyclic Tetracarboxylic Dianhydrides

| No. | Structure |
|---|---|
| D3 | methyl-substituted bicyclic dianhydride (with CH$_3$) |
| D4 | tricyclic dianhydride |
| D5 | cyclobutane tetracarboxylic dianhydride |
| D6 | bicyclopentane tetracarboxylic dianhydride |
| D7 | bis(succinic anhydride) |
| D8 | cyclohexane-1,2,4,5-tetracarboxylic dianhydride |
| D9 | bis(norbornane dianhydride) linked by –Si(Me)$_2$–O–Si(Me)$_2$– |
| D10 | norbornane-2,3,5,6-tetracarboxylic dianhydride |
| D11 | tricyclic tetracarboxylic dianhydride |

EXAMPLE 1

This example illustrates the use of fluorinated monoamine in a poly(amic acid) formulation and the use of the poly (amic acid) to prepare a polyimide optical alignment layer for alignment of liquid crystals.

To a solution of 5-(trifluoromethyl)-1,3-benzenediamine (83 mg) and 4-(1H,1H-perfluorooctyloxy)benzeneamine (14.1 mg) in γ-butyrolactone (1.12 g) was added 3,3',4,4'-benzophenonetetracarboxylic dianhydride (161.1 mg) at room temperature under a nitrogen atmosphere and the mixture stirred 22 hr. The solution was diluted with γ-butyrolactone (3.78 g) before spinning of optical alignment layers.

Two 0.9 inch by 1.2 inch by 1 millimeter thick borosilicate glass substrates with transparent indium-tin-oxide (ITO) electrode coatings (Donnelly Corp., Holland, Mich.) were spin-coated and cured with the polyimide formulation to give optical alignment layers. Spin coating was achieved by filtering the prepolymer solution through an 0.45 mm Teflon filter membrane directly onto the surface of the clean ITO glass substrates. The coated ITO glass substrates were then spun at 2500 RPM for 1 min to produce uniform thin films. The resultant thin films were cured under nitrogen 0.25 h at 80° C. followed by 1 h at 180° C.

The coated substrates were exposed to ultraviolet polarized light (300–400nm) using an Innova 400 (Coherent Incorporated, Santa Clara, Calif.) laser.

A twisted nematic liquid crystal cell was constructed from the two exposed coated substrates. Four micron spacers were mixed in with an epoxy and the epoxy mixture was placed at the edges of the coated side on one exposed substrate. The second exposed substrate was placed on top of the first substrate such that the alignment layers were facing each other and the respective background alignment directions were perpendicular to each other. The substrates were pressed to a four micrometer spacing using clamps and the fiber spacer/epoxy mixture was allowed to cure. Two spaces on opposite sides of the cell were left unsealed so that the liquid crystal would fill the cell along the bisector between the alignment directions of the substrates. The cell was placed in a vacuum and, subsequently, one unsealed opening on the cell was dipped into a nematic liquid crystal doped with chiral compound. After filling, the cell was removed from the liquid crystal and vacuum, cleaned up, and the spaces sealed with epoxy. The cell was subsequently heated above the nematic-isotropic transition of the liquid crystal to remove any defects introduced during filling.

The cell was viewed between parallel and crossed polarizers on a photographic light box. For the two polarizer configurations, the transmission of the cell was consistent with a twisted nematic orientation of the liquid crystal and the cell gave a net uniform twisted nematic alignment. The pre-tilt angle was measured using the crystal rotation method to be approximately 1 degree.

EXAMPLE 2

This example further illustrates the use of fluorinated monoamine in a poly(amic acid) formulation and the use of the poly(amic acid) to prepare a polyimide optical alignment layer for alignment of liquid crystals.

To a solution of 5-(trifluoromethyl)-1,3-benzenediamine (83.6 mg) and 4-(1H,1H-dihydroperfluorooctyloxy) benzeneamine (12.3 mg) in γ-butyrolactone (1.31 g) was added 3,3',4,4'-benzophenonetetracarboxylic dianhydride (161.1 mg) at room temperature under a nitrogen atmosphere followed by stirring for 23 hr at room temperature. The mixture was diluted with γ-butyrolactone (3.57 g) before spinning optical alignment layers.

The substrates were coated and processed as described in example 1, the exposure conditions were adjusted accordingly for this formulation and a different nematic liquid crystal was used. The cell was viewed between parallel and crossed polarizers on a photographic light box. For the two polarizer configurations, the transmission of the cell was consistent with a near homeotropic orientation of the liquid crystal and the cell gave a net uniform near homeotropic alignment. The pre-tilt was measured to be approximately 86 degrees.

We claim:

1. A polyamic acid which is the reaction product of an amine component comprising a monoamine of the formula:

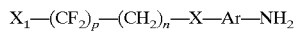

wherein Ar is selected from the group consisting of

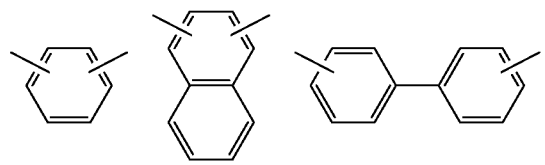

X is selected from the group consisting of —O—, —S— and —NR— and a covalent bond, wherein R is H or a $C_1$ to $C_4$ hydrocarbon, X1 is selected from HE and F, n is 0–4 and p is 6–20, wherein when X is —S— or a covalent bond, n is 1–4 and wherein the monoamine comprises about from 0.1 to 15 mol % of the amine component; at least one diamine; and at least one tetracarboxylic dianhydride; wherein the monamine comprises about from 0.01 to 5 mol % of the main component.

2. A polyamic acid of claim 1 wherein X is selected from the group —O— and —NR— and n is 1–4.

3. A polyamic acid of claim 1 wherein the tetracarboxylic dianhydride is a diaryl ketone tetracarboxylic dianhydride of the general formula

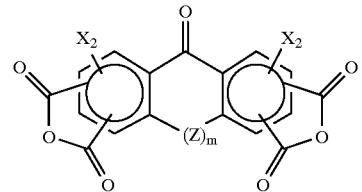

wherein $X_2$ is independently selected from the group 11, CL, F, Br, $R_1$ and $R_1O$—, wherein $R_1$ is independently selected from $C_1$–$C_3$ perflourinated alkyl chain, $C_1$–$C_3$ partially fluorinated alkyl chain and $C_1$–$C_8$ hydrocarbon chain; m is 1 or 0; and Z is selected from the group —S—, —O—, —$SO_2$—, —$CH_2$, —$C((CF_3)_2$, —C(O)—, —$CH_2CH_2$—, —NR— and a covalent bond, wherein R is a $C_1$–$C_4$ hydrocarbon chain.

4. A polyamic acid of claim 3 wherein the tetracarboxylic dianhydride is selected from 3,3'4,4'-benzophenonetetracarboxylic dianhydride and 2,2'-dichloro-4,4',5,5'-benzophenonetetracarboxylic dianhydride.

5. A polyamic acid of claim 4 wherein the tetracarboxylic dianhydride consists essentially of 3,3'4,4'-benzophenonetetracarboxylic dianhydride.

6. A polyimide derived from the polyamic acid of claim 1.

7. A polyimide derived from the polyamic acid of claim 2.

8. A polyimide derived from the polyamic acid of claim 3.

9. A polyimide derived from the polyamic acid of claim 4.

10. A polyimide derived from the polyamic acid of claim 5.

11. A process for inducing pre-tilt in alignment of a liquid crystal medium adjacent to a surface of an optical alignment layer comprising:
   (a) exposing at least one optical alignment layer, comprising anisotropically absorbing molecules and hydrophobic moieties, to polarized light; the polarized light having a wavelength within the absorption band of said anisotropically absorbing molecules; wherein the exposed anisotropically absorbing molecules induce alignment of the liquid crystal medium at an angle + and −θ with respect to the direction of the polarization of the incident light beam and along the surface of the optical alignment layer, and induce a pre-tilt at an angle Φ with respect to the surface of the optical alignment layer; and
   (b) applying a liquid crystal medium to the optical alignment layer, and wherein the anisotropically absorbing molecules and hydrophobic moieties are covalently bonded to a polyimide of claim 6.

12. A liquid crystal display element comprising a polyimide of claim 6.

13. A polyamic acid of claim 1 wherein the monoamine comprises about from 1 to 12 mol % of the amine component.

* * * * *

UNITED STATES PATENT AND TRADEMARK OFFICE
CERTIFICATE OF CORRECTION

PATENT NO. : 5,929,201
DATED : July 27, 1999
INVENTOR(S) : Wayne M. Gibbons, Paul J. Shannon, Shao-Tang Sun It is certified that error appears in the above-identified patent and that said Letters Patent is hereby corrected as shown below:

On the title page: Item [56] Reference Cited, please add:
| | | | | |
|---|---|---|---|---|
| Lee | U.S. Patent | 5,382,548 | 437/233 | 01/1995 |
| Shannon et al. | U.S. Patent | 5,073,294...252/299.01 | | ....12/1991 |
| Watanabe et al. | U.S. Patent | 5,237,440...359/90 | | ....08/1993 |

Col 1, line 13, insert --This invention was made with United States Government support under cooperative agreement No. 70NANB4H1525 awarded by the United States Department of Commerce. The United States Government has certain rights in the invention.--
Col 1, line 63, insert --H or-- after a R is;
Col 24, line 66, delete "3" insert --4-- in its stead;
Col 25, line 55, delete "3" insert --4-- in its stead;
Col 26, line 22, delete "X1" insert --$X_1$-- in its stead;
line 22, delete "HE" and insert --H--,
line 27, delete "0.01 to 5" and insert --0.1 to 15--;
line 28, delete "main" and insert --amine--;

Signed and Sealed this

Twentieth Day of February, 2001

Attest:

NICHOLAS P. GODICI

Attesting Officer

Acting Director of the United States Patent and Trademark Office